(12) United States Patent
Cournoyer et al.

(10) Patent No.: US 10,551,164 B2
(45) Date of Patent: Feb. 4, 2020

(54) METHOD, KIT AND TARGET FOR MULTIMODE 3D IMAGING SYSTEMS

(71) Applicant: NATIONAL RESEARCH COUNCIL OF CANADA, Ottawa (CA)

(72) Inventors: Luc Cournoyer, Gatineau (CA); Michel Picard, Orleans (CA)

(73) Assignee: National Research Council of Canada, Ottawa, Ontario (CA)

( * ) Notice: Subject to any disclaimer, the term of this patent is extended or adjusted under 35 U.S.C. 154(b) by 151 days.

(21) Appl. No.: 15/678,230

(22) Filed: Aug. 16, 2017

(65) Prior Publication Data

US 2018/0238677 A1 Aug. 23, 2018

Related U.S. Application Data

(60) Provisional application No. 62/376,991, filed on Aug. 19, 2016.

(51) Int. Cl.
*G01B 11/00* (2006.01)
*G01B 11/03* (2006.01)
(Continued)

(52) U.S. Cl.
CPC ............ *G01B 11/002* (2013.01); *G01B 11/00* (2013.01); *G01B 11/03* (2013.01); *G01C 11/00* (2013.01); *G01C 15/06* (2013.01)

(58) Field of Classification Search
CPC ....... G01B 11/002; G01B 11/00; G01B 11/03; G01C 11/00; G01C 15/06
See application file for complete search history.

(56) References Cited

U.S. PATENT DOCUMENTS 8,364,245 B2 1/2013 Kruecker
8,489,177 B2 7/2013 Welch
(Continued)

FOREIGN PATENT DOCUMENTS

WO 2012142356 A1 10/2012

OTHER PUBLICATIONS

Product Offering Basis Software, Description: "Flat contrast target, SMR-compatible", Part No. 4025.1000.009, Jun. 21, 2012. 1 page.
(Continued)

*Primary Examiner* — Kara E. Geisel
*Assistant Examiner* — Amanda Merlino
(74) *Attorney, Agent, or Firm* — Kenneth Murphy

(57) ABSTRACT

A technique for acquiring target's coordinates for industrial dimensional metrology involves a target that serves both as a 2D contrast target and a 3D contact target, and a metrology tool. The target has proximal and distal surfaces, at least some of which being primarily flat and facing a common normal direction. At least 3 mm separate the proximal and distal surfaces in the normal direction. Reflectivity factors of the distal and proximal surfaces differ by at least 20%. Risers connecting pairs of the proximal and distal surfaces are sufficiently undercut so that none of the risers are in view at nominal viewing angles. At least two reference edges are defined where risers meet proximal surfaces. The tool has meeting features for registration with the edges and primarily flat surfaces, in at least two registered positions, to permit a retroreflector of the tool to acquire coordinates the target centre.

21 Claims, 4 Drawing Sheets

(51) Int. Cl.
    *G01C 11/00*    (2006.01)
    *G01C 15/06*    (2006.01)

(56) References Cited

U.S. PATENT DOCUMENTS

| | | | |
|---|---|---|---|
| 8,548,563 B2 | 10/2013 | Simon et al. | |
| 8,721,660 B2 | 5/2014 | Ulfarsson et al. | |
| 8,724,120 B2 | 5/2014 | Steffey et al. | |
| 8,902,408 B2 | 12/2014 | Bridges | |
| 2012/0099096 A1* | 4/2012 | Bridges | G01B 11/002 356/5.01 |
| 2012/0265479 A1 | 10/2012 | Bridges | |

OTHER PUBLICATIONS

The Journal of the CMSC The Publication for 3D Measurement Technology, vol. 9, No. 2, Autumn 2014. 35 pages.
Beraldin, J.-A. et al. "Multi-Resolution Digital 3D Imaging System Applied to the Recording of Grotto Sites: The Case of the Grotta dei Cervi." Oct. 30-Nov. 4, 2006. 10 pages.
MacKinnon, David. NRC Experiments for ASTM E57.02 Medium Range Measurement Error Standards Development. Jul. 24, 2014, 47 pages.

\* cited by examiner

METHOD, KIT AND TARGET FOR MULTIMODE 3D IMAGING SYSTEMS

CROSS-REFERENCE TO RELATED APPLICATION

This application claims the benefit of U.S. Provisional Patent Application No. 62/376,991 filed on Aug. 19, 2016, the contents of which are herein incorporated.

FIELD OF THE INVENTION

The present invention relates in general to targets for non-contact industrial dimensional metrology, and in particular to targets and target systems, of which a variety of non-contact measurement systems can reliably acquire spatial coordinates.

BACKGROUND OF THE INVENTION

Measuring object positions in space is a routine, but important activity in industry, and is generally called industrial dimensional metrology. The present invention is directed to large scale industrial dimensional metrology, which concerns measurements over a volume of a few cubic meters to several 100 meters cubed. There is always a need for higher accuracy, higher resolution, acquisition of spatial coordinates with lower cost measurement systems and equipment, in less acquisition time, with less processing power and complexity, and with less equipment setup and calibration time, although various application spaces have different weightings for these requirements.

One thrust to achieve these goals is multi-modal acquisition, which holds the promise of leveraging advantages of different measurement systems. For example, if two lower cost measurement systems, such as a higher accuracy, slower, point-wise measurement system (like laser trackers and optically tracked coordinate measurement machines), and faster, wide field of view, acquisition systems (such as photogrammetric systems) can together acquire in less time, large scene spatial arrangement information from an object space with as good or better accuracy and precision than slower, but usually higher cost systems (like 3D laser scanners, and LIDAR systems), a larger market for the coordinated (multi-modal) lower cost measurement systems may open up.

Furthermore, some LIDAR and 3D laser scanners present views of the object space that are unnaturally devoid of surface colour or texture information and it may be desirable to augment such views with photographic information. So integration of data from different measurement systems is desirable for several reasons.

Integration of multimodal information is essential to newer and more advanced techniques (e.g. photogrammetric processes), which rely on "point cloud" data. There are growing uses for verifying integration and registration of separate 3D image point clouds.

Unfortunately there are some problems with aligning data produced by disparate measurement systems. Each measurement system typically has a respective coordinate system, and mapping the object space representations of multiple systems is uncertain, and leads to greater uncertainties at distance from the origins of the two systems. If one can acquire a same target in each of a plurality of object space representations, the mapping uncertainty can be reduced greatly, and systematic, low complexity, algorithms known in the art can be used to accomplish the mapping.

Even if multimodal measurement systems are not used, targets that are capable of reliable, efficient spatial coordinate acquisition for a number of measurement systems reduce a number of targets required for field work or deployment, and provide greater flexibility of redesigning measurement systems after deployment.

As an example of the knowledge in the field of targets for non-contact dimensional metrology, Applicant offers: The Journal of the CMSC The Publication For 3D Measurement Technology, Vol. 9, No. 2, Autumn 2014. The target claimed and used to demonstrate the present invention was incidentally shown on the coverpage of the issue. It has a crossed-rectangle shape (sometimes referred to as a bowtie shape). No description of any part of these targets was provided in the paper authored by Applicant contained in the issue. The images in the paper itself were essentially 2D and therefore indistinguishable from well-known prior art 2D contrast targets. The image clearly highlights spherical targets and their applications for non-contact dimensional metrology. The image is included in the journal as an eye catching and busy illustration of a metrology system. The inclusion of the image was incidental, and is clearly deemphasized in the image as the spherical targets used are all identified by various identifiers and connections.

Applicant notes that the field of this Journal, and particularly Applicant's paper, on pp. 4-10 of the issue, is fundamental metrology as opposed to industrial or applied metrology: The purposes relate to comparisons of measurement systems, and standards for tracing confidence in measures to the standards, as opposed to measurements of industrial articles, and the equipment therefor.

In Applicant's paper (Target selection starting near bottom of left col. p. 8), it is noted that there are 3 classes of target: contrast (C), spherical (S), and plane (P). FIG. 4 shows illustrations of each: including contrast type targets a crossed-rectangular target (C-NRC), and a concentric circular target (C-HDS); three spherical targets (S-ATS, S-INO, and S-Men); and a single plane (P-1) and a 3 plane (P-3). See also FIG. 2 for another example of a single plane target (a), and a target with an end that is of a crossed rectangular (bowtie) cross-section shape, for easy identification of a centre of the target. The paper states, regarding FIG. 4:

> The ideal target would be one in which derivation of the target center is highly repeatable for all scanning systems and would be measurable by the RI (Reference Instrument). The final decision of target type was not based solely on repeatability, but this metric could be used to eliminate targets that perform poorly. For example, spheres were favored even before testing was initiated because they can be imaged from any position or orientation. As a result, these experiments were used to determine how well spheres performed compared to other target surfaces such as contrast targets and planes. Spheres and planes also have the benefit of being easily measured using the SMR of a laser tracker, something not possible with most contrast targets.

A section entitled Estimating target geometric centers on p. 7 offers some insight into why the "derivation of the target center" is important, and how the person of ordinary skill would be led to the conclusion that spheres are ideal candidates for targets.

This disclosure does not address integration of 2D and 3D imaging systems, but rather disparages contrast type targets, which are reliably and efficiently used in 2D methods and in photogrammetric applications. An important feature is lost in discarding the contrast type targets that was not expressed in the paper: it is particularly easy to reliably determine the centre of contrast targets of the crossed rectangular form, using 2D techniques, and 3D approaches based on corrected 2D techniques.

Basis Software Inc. (Redmond Wash.) has developed and marketed a flat contrast target designed to be mounted to a nest for a SMR. The target has a conventional, contrast, crossed rectangular (bowtie) pattern on one side and a hemisphere mounted on the other side. The hemisphere is designed to be received in a nest for an industry-standard 1.5" retroreflector (SMR). Such a target makes the nest useful for 2D and 3D approaches. Thus, a point identified with the nest by a 3D measurement system (such as a laser tracker) with an SMR mounted to the nest, and a point associated with the nest by a 2D measurement system (a laser scanner, lidar, or photogrammetric system) using the flat contrast target, can be reliably associated by the fixity of the nest.

Reportedly the centre of the contrast target and the 3D measurement's centre are within 50 µm of deviation from each other. Unfortunately aligning the hemisphere with respect to the centre of the flat contrast target leads to errors in such a system, and increases complexity and costs of producing of these targets. Furthermore, it would be preferable if the same surface can be used both for contact with an SMR and for 2D contrast imaging, to avoid having to replace targets in a scene between 2D and 3D imaging, and to reduce equipment for dimensional metrology.

Accordingly there is a need for a technique for improving integration of targets for different imaging modalities, and particularly to targets for which a derivation of the centre is repeatable.

SUMMARY OF THE INVENTION

Current 3D targets that can be used for large scale industrial dimensional metrology with contact retroreflector type devices (e.g. spherically mounted retroreflectors (SMR)) are incompatible with flat, 2D contrast targets. The former typically being nests and the latter are typically flat surfaces. One chief advantage of a multimodal target that combines these forms is that alignment of images and object spaces is greatly facilitated.

Applicant has invented a multimodal target that, viewed from a range of angles, presents a 2D contrast target of a common centre. Each viewed 2D contrast target is defined by high contrast linear edges. An intersection of pairs of the lines defines a unique point (herein called the centre) just as the conventional linear arrangement of crossed-rectangular contrast targets. The edges are defined by mechanical reference features for reliably acquiring coordinates of the centre using 3D measurement techniques and a reliable process for doing so is provided.

Advantageously, the mechanical reference features define the high contrast edges, so that measurement processes for 2D and 3D coordinate acquisition are similar, and use an overlapping set of points on the multimodal target (which reduces the number of reference features on the multimodal targets as well as the effort and cost required to align the multiple reference features during fabrication. The identification of an intersection of lines is a robust coordinate acquisition process. The edges of the multimodal target define both high contrast 2D targets at different viewing angles, and physical edges, so reliable and repeatable acquisition of spatial coordinates of a centre of the target is made possible using 3D (e.g. contact probing, photogrammetry, LiDAR, time of flight, and triangulation) measurement systems. A particular process and tool is provided for contact based acquisition, and a kit comprising the tool and target is provided.

A copy of the claims as filed are incorporated herein by reference.

Accordingly, a kit for determining a position of a target for industrial dimensional metrology, is provided. The kit has a target and a metrology tool: the target has a mounting part for mounting in an object space, and a target face, the target face including at least one proximal surface and at least one distal surface, where: each of the distal or each of the proximal surfaces is primarily flat and faces a common normal direction; each distal surface differs by at least 3 mm from each proximal surface along the normal direction; reflectivity factors of each of the distal surfaces differ by at least 20% from that of each of the proximal surfaces; risers connecting pairs of the proximal and distal surfaces are sufficiently undercut so that none of the risers are in view at any angle within 5° from the normal direction; and at least two reference edges are defined where risers meet respective proximal surfaces. The tool has either a retroreflector or a nest for a retroreflector, and one or more meeting features for registration with one or more of the edges and the primarily flat surfaces. The edges are arranged so that acquisition of coordinates of the retroreflector, or a retroreflector mounted in the nest, with the tool in at least two registered positions, determine at least a centre of the target.

The edges may be primarily linear, and may extend a length of the risers. The edges may extend radially from the centre, or offset from radial by a fixed distance.

The risers may be sufficiently undercut so that none of the risers are in view at any angle 15° from the normal direction. The risers may be undercut bevels. The bevel may have an angle from 15-75°, or 30-60°.

At least one of the meeting features may be infinitely rotationally symmetric about a line passing through a centre of the retroreflector, whereby an angle of the tool with respect to the line has no influence on a measurement of the retroreflector's position.

The meeting features may comprise: one or more first features for contacting contact areas of the target, to register the tool to one of the primarily flat surfaces; and one or more second features for contacting one or more of the edges.

Each contact area is near one of the edges, and the contact areas may be located on the distal surfaces, the proximal surfaces, or both, but preferably are on only one of the distal surface, and the proximal surface. The contact areas may have a surface area to match the one or more first features that fix the tool in one or more angular degree of freedom as well as fixing the tool location in the normal direction when registered. The contact areas may only be on the proximal surfaces, in bands parallel to the edges.

The tool may comprise a plurality of sets of the second features, arranged so each set is adapted to contact respective ones of the edges concurrently in a registered pose.

The edges may be linear, and define the target centre as a midpoint between measured points of the retroreflector projected onto a plane of the proximal surface, and the tool may comprise three second features arranged in a triangle.

The three second features may be spaced to permit two second features to meet one edge and the third to meet a second edge of the same distal surface, in at least two visibly different configurations, and the triangle may not be equilateral.

The three second features may be spaced to permit two second features to meet two edges of one distal surface, and the third to meet an edge of another distal surface, in at least two visibly different configurations, and the triangle may be non-equilateral.

The edges may define four lines, extending generally radially from the target centre, and the tool may comprise four sets of second features, each for contacting respective ones of the edges at single points, and a mechanism for pressing the second features against the edges while they are free to slide along the edge until the tool is registered.

The mechanism may include a resilient system for pressing against each of the respective edges, with registration achieved when pressure is equalized and no further movement is observed with increasing pressure.

Also accordingly a method is provided for determining a position of a point in an object space for industrial dimensional metrology. The method comprises: mounting a target in an object space to present a target face of the target, the target face including at least one proximal surface and at least one distal surface, where: each of the distal surfaces or each of the proximal surfaces is primarily flat and faces a common normal direction; each distal surface differs by at least 3 mm from each proximal surface along the normal direction; reflectivity factors of each of the distal surfaces differ by at least 20% from that of each of the proximal surfaces; risers connecting pairs of the proximal and distal surfaces are sufficiently undercut so that none of the risers are in view at any angle 5° from the normal direction; and at least two reference edges are defined where risers meet respective proximal surfaces; and contacting a metrology tool comprising a retroreflector or a nest therefor, with the target face, with one or more meeting features of the tool contacting one or more of the edges; acquiring coordinates of the retroreflector; and using the acquired coordinates to determine at least a centre of the target.

At least one of the meeting features may be rotationally symmetric about a line passing through a centre of the retroreflector, whereby an angle of the tool with respect to the line has no influence on a position of the edge relative to the position of the retroreflector's position.

Contacting the tool may comprise: contacting one or more first features of the tool with contact areas of the target, to register the tool to one of the primarily flat surfaces in the normal direction; and contacting one or more second features of the tool with the one of the edges at one or more locations.

Each contact area may be near one of the edges, and the contact areas may be located on the distal surface, the proximal surface, or both, but is preferably either the distal surface, or the proximal surface but not both. The contact areas may have a surface area to match the one or more first features that fix of the tool in one or more angular degrees of freedom as well as fixing the tool location in the normal direction when registered. The contact areas may only be on the proximal surfaces, in bands parallel to the edges.

The tool may comprise a plurality of sets of the second features, arranged so each set is adapted to contact respective ones of the edges concurrently in a registered pose.

The edges may be linear, and define the target centre as an intersection of mean geometric lines defined by the edges projected onto a plane of the proximal surface, and the tool comprises two sets of second features, a first set for contacting a first of the edges at a single point, and a second set for contacting a second of the edges at two separate points.

The edges may be linear, and define the target centre as an intersection of mean geometric lines defined by the edges projected onto a plane of the proximal surface, and the tool comprises three sets of second features, each set for contacting a respective different one of the edges at a single point.

The edges may define four lines, extending generally radially from the target centre, and the tool may comprise four sets of second features, each for contacting respective ones of the edges at a single points, and mechanism for pressing the second features against the edges while they are free to slide along the edge until the tool is registered.

Moreover a system is provided for determining a position of a point in an object space for industrial dimensional metrology. The system comprises: a target mounted in an object space to present a target face of the target to at least one acquisition system, the target face including at least one proximal surface and at least one distal surface, where: each of the distal and proximal surfaces is primarily flat and faces a common normal direction; each distal surface differs by at least 3 mm from each proximal surface along the normal direction; reflectivity factors of each of the distal surfaces differ by at least 20% from that of each of the proximal surfaces; risers connecting pairs of the proximal and distal surfaces are sufficiently undercut so that none of the risers are in view at any angle 5° from the normal direction; and at least two reference edges are defined where risers meet respective proximal surfaces; and a metrology tool bearing a retroreflector with the target face, with one or more meeting features of the tool contacting one or more of the edges; and the acquisition system for acquiring coordinates of the retroreflector, and using the acquired coordinates to determine at least a centre of the target.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
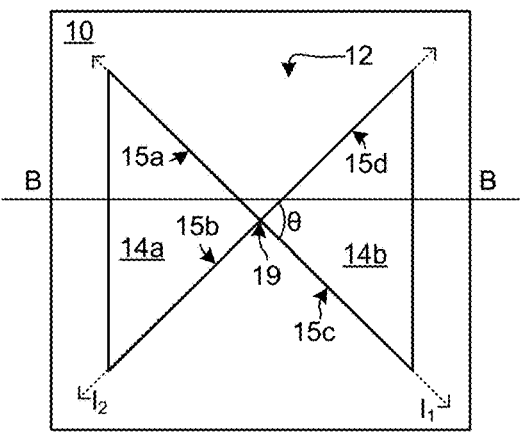
FIG. 1 is a schematic top plan view of a multi-modal target in accordance with a first embodiment of the present invention.

Herein a technique (system, kit and method) is described for acquiring coordinates of a multimodal target for industrial dimensional metrology. The multimodal target is included in the kit and system, and is designed to be mounted rigidly to an object, wall, or structure in an object space.

The multimodal target is a mechanical body bearing a target face that includes, at least one proximal surface, and one or more distal surfaces. Each of the proximal or each of the distal surfaces is substantially planar (primarily flat) and has a common normal direction and a common elevation in that direction. Preferably both the proximal and distal surfaces are primarily flat and all face the common normal direction, but only one set of these is required to provide contact areas that serve as reference surfaces for present purposes, and the other such surfaces need not be flat, or oriented to face the normal direction.

The distal surfaces are at least 3 mm recessed with respect to the proximal surfaces. The proximal surfaces preferably have an elevation different from the distal surfaces by (5-50 mm, and more preferably about 7-21 mm. The proximal surfaces have reflectance factors that are different from those of the distal surfaces by at least 20% (preferably 25-75%, most preferably 45-75%). The proximal and distal surfaces preferably have suppressed specular reflection and a matte finish.

It will be appreciated that aluminum, when suitably roughened for low specularity, has a reflectivity of about 50%, and accordingly could be used for either a low reflectance (dark), or a high reflectance (light) surfaces. Also opaque plastics can have the required optical and mechanical properties. Given that stable, low reflectance, black, materials are economical and available with more extreme values and low specularity, it is preferable that the dark surfaces have a reflectance factor less than 20%, more preferably less than 15%, more preferably less than 10%, more preferably less than 5%. It may be preferable to use a wear-resistant light material (such as aluminum or a hard plastic) at contact areas on the target face where a metrological tool is designed for contacting the target, which may be on the distal or proximal surfaces.

It is generally preferable for the distal surfaces to be dark so that shadows cast by overhung edges (explained below) that extend between the distal and proximal surfaces will not adversely affect contrast between the dark and light surfaces. Otherwise more expensive, diffuse lighting may be required to avoid shadows interfering with a crispness of the high contrast edges.

The distal and proximal surfaces are joined by a set of at least two risers. The risers are undercut so that none of the risers are in view at any angle of 5° (more preferably a higher angle up to the lesser of: an angle at which the multimodal target is not useful as a 2D target, such as at an angle of 70°, 75°, 80° or 85° from the normal; or an angle at which the edge lacks suitable rigidty, dimensional stability, and longevity, which may be a substantially lower angle of 60-88°, depending on design and materials. The undercutting may be provided by undercut bevels, with slopes of 10-80° (or increasingly preferably 15-75°, 20-70°, 25-65°, 30-60°, or 40-50°) from the reference surface. The risers meet the proximal surfaces to define a set of reference edges. This ensures that imaging at angles of incidence less than the undercut angle, a steep drop in the elevation, and a substantial change in reflectance, both demarcate the edge.

At least 2 reference lines may be defined, each by one or more of the reference edges of the set. The target region may have the shape of a crossed rectangle, also referred to as a bowtie shape, which generally consists of two dark triangles separated by two light triangles, with each of the triangles sharing a vertex that is the centre of the target. The angles swept by the triangles at the vertex are typically 90°. Naturally three distal triangles (or more) may be used in principle, however such targets are not currently preferred because: 1—two are sufficient, 2—inclusion of further contrast areas decrease a surface area of each distal surface for a given target size, 3—algorithms for automated identification of targets from images are expected to not be as effective at finding triangles radiating from a common point with narrower angle, and 4—an interior space available for contacting the edges of narrower angles limits the sampling region available, or decreases a variety of metrology tools that can be used for measurement. As such, the edges between the dark and light triangles on opposite sides of the vertex appear to be collinear. While this is by no means necessary, users are familiar with this design, software for automatic registration of the target have been known to rely on such features for either identification of the target or alignment thereof with other image sets, and therefore it is preferable to maintain this form.

Preferably the edges radiate generally from a centre of the target, and are linear. Conforming to the expected format of the crossed rectangle, with a 90° angle, substantially radial lines from the target centre are provided in pairs that are substantially opposed (180°) to each other. It should be noted that the paired edges do not have to be collinear or approximate collinearity to any degree for the present invention. The two edges should be symmetric under 180° rotation about the center to their respective pairs, but do not have to be collinear. An arbitrary, fixed, offset of the paired lines in one direction is perfectly acceptable, as long as the paired lines are parallel to a high degree, and the other paired lines are offset by the same amount in the opposite direction so that the 180° rotational symmetry is observed. As such, the opposite (paired) edges may be parallel to within less than 2 degrees to 20 seconds of arc, more preferably from 1-100 minutes of arc. To avoid any difficulties with 2D measurement of the target, the spatial offset between the opposite side edges may be less than 10 mm (more preferably less than 3 mm, or less than 1 mm).

The kit further comprises a metrology tool having at least one of a holder for a retroreflector and a retroreflector. The tool has one or more meeting surfaces that are adapted to be registered in position with respect to the contact areas of the multi-mode target. The registration involves meeting the contact areas, including the edges, in a repeatable manner, and may include a first surface for meeting contact areas of one of the proximal and distal surfaces.

The tool may have only one surface, such as of an SMR, which contacts both the distal surface adjacent the edge, and the edge. If so, the distal surface and edge are the only contact areas and constitute the only reference surfaces that need to be high accuracy, planar surfaces. Such a kit will typically require at least 8 measurements (2 on each of the 4 edges) to acquire a center (without estimating uncertainty), and at least 12 measurements to determine uncertainty.

The tool may have two types of surfaces: edge surfaces for contacting an edge, and normal surfaces for contacting either the proximal or distal surface. Either type of surface may be a flat surface to match the edge or the proximal/distal surface, or may include features typically used in kinematic or quasi-kinematic mounts, such as cylindrical, spherical, or hemispherical protrusions. The arrangement of the edge surfaces and normal surfaces permit the tool's edge surface to contact an edge while the normal surface contacts a respective contact area on the proximal or distal surface. The tool may comprise a plurality of edge and normal surfaces, arranged to meet at least 2 distinct edges, such as at 3 separated points on 2 distinct edges, 3 points on 3 distinct edges, or movable to contact 4 points on 4 distinct edges. Such a tool may have a SMR nest located within a polygon defined by the points.

A method of finding a centre of the multimodal target using a 3D measurement system comprises measuring a position of a SMR that is, or is mounted to, the tool at a plurality of registered positions, determining one or more lines, and computing a midpoint of the line, or an intersection of two of the lines, to identify the centre.

Herein terms of geometrical idealization are understood to be used to communicate the idea for practical implementation, which is understood to always involve some tolerances. Any reasonable approximation to the geometrical idealization that is sufficient for an intended purpose is satisfactory, except to the extent that the term is qualified numerically.

FIG. 1 is a schematic illustration of a multi-modal target 10 in accordance with an embodiment of the present invention. Target 10 is a body and substantially a whole top face of the target 10 is a target face in accordance with the present invention surrounded by a frame that has no major part in the invention. A proximal surface 12 surrounds both of two distal surfaces 14a,b that are of different elevation than the surface 12, specifically being recessed by a distance R (see FIG. 1B for a specific construction in side elevation cross-sectional view showing R). The target 10 is of a composition to be dimensionally stable, with negligible compliance under manual load of intended tools, and in an expected range of operating conditions, when mounted in an object space. It will be appreciated that in other embodiments, the frame may be eliminated, and the target 10 may further comprise rounded or champfered periphery. Although none are shown, any of the array of mounting features known in the art may be included in the target 10 as long as they do not occlude the target face to the detriment of measurement by 2D or 3D techniques.

The two distal surfaces 14a,b are of a different elevation, and have different reflectance factor values, than the proximal surface 12. Preferably proximal surface 12 has a higher reflectance factor value (is a "lighter" surface), and the distal surface 14 has a lower reflectance factor value (is a "darker" surface), to avoid shadow effects from the edges 15. At least the surfaces 14 and 12 must have markedly different reflectance factor values to provide for operation as a contrast target. A matte, non-specular surface is preferred in both cases, as a dark and as a bright surfaces.

Four edges 15a,b,c,d defined between the surfaces 14 and 12 are reference features of the target 10. As such the edges 15 are adapted for contact-based, high resolution 3D laser scanning, and imaging based industrial dimensional metrology. In this embodiment, the only reference features are the edges 15 and a set of contact areas on one or both of the surfaces 12,14. To make the target suitable for use with a widest array of metrology tools, the whole of the surfaces 12,14 may be reference features and have a high level of planarity at the scale of interaction with the metrology tool. As such, a whole of the 2D target is available for use as the 3D target. In order to minimize a cost of tooling, the contact areas may be limited to specific areas on the target, such as in a band on the proximal surface 12 that follows the edges 15, or an area substantially centered between the distal surfaces 14, at a radius of about half the extent of the distal surfaces 14; or on the distal surface 12 substantially underlying and adjacent to the edge, or near a center of the distal surfaces 14. Away from the contact areas, the surface properties, shape and hardness are irrelevant.

Edges 15a,c are shown collinear with a first reference line ($I_1$), and edges 15b,d are collinear with a second reference line ($I_2$), although for present purposes, it is sufficient that these edges 15 are parallel to their reference lines, and an average of the lines are coincident with their reference lines. Edges 15a,b lie between area 14a and the surface 12, and edges 15c,d lie between area 14b and surface 12. The lines $I_1,I_2$ meet at a nexus 19 at a given angle $\theta$. This angle $\theta$ may be 90°, so that the target has substantially equal dark and light areas. An angle other than 90° will facilitate identification of a centre of the target 10 for one set of orientations of the target 10 to measurement equipment, at the expense of other orientations.

The edges 15 are undercut edges, such that at any viewing angle of incidence of 5°, or more preferably of 10°, 15°, 20°, 25°, 30°, or 35°, none of a riser joining the surfaces 12,14 at the edge 15, are in view, to ensure that the edge 15 defines a 2D contrast target over that range of viewing angles of incidence. The undercutting may define a bevel, and the angle of that bevel may be between 15°-75° or more preferably 30°-60°.

Figure 1A:
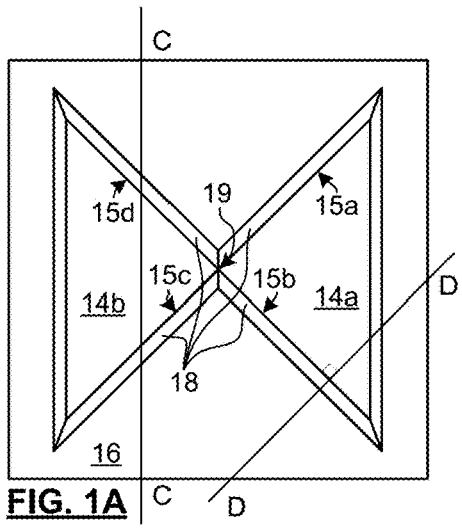
FIG. 1A is a bottom plan view of the multi-modal target without a backing plate, to show a shape of an undercut bevel extending between the backing plate and a proximal surface.

FIGS. 1A,B,C,D, show a 2 piece embodiment of multi-modal target 10, but it will be appreciated that the design of FIG. 1 can equally be a monolithic part as formed by injection molding, for example. It will be appreciated that injection molding can produce high quality parts at a low cost relative to machining.

FIG. 1A is a bottom plan view of a top piece 16 of the target 10, i.e. a plan view of a back-side of the target 10, with a backing plate 17 removed. The two distal surfaces 14 are two parts of a top surface of the backing plate 17. Openings in the top piece 16 expose the top surface of the backing plate 17 in these to parts. Herein, a formed top piece 16 mounted to a backing plate 17 is referred to as the two piece design for the target. An advantage of the two piece design is that the top piece 16 can be molded using a single pull mold (in a one-step operation without requiring an expensive or complicated mold with moving parts) or possibly stamping/cutting of plates, and the backing plate 17 need not have exigent geometrical tolerances, or may only require planarity of the top surface parallel to the proximal surface 12.

The top piece 16 is shown formed with open through holes surrounded by undercut bevels 18 that define sloped surfaces from a bottom face of the top piece 16, to the reference edges 15. Similar bevels are shown along triangular edges opposite the vertex 19 bordering the distal surfaces 14, but these are unnecessary in presently preferred embodiments.

Figure 1B:
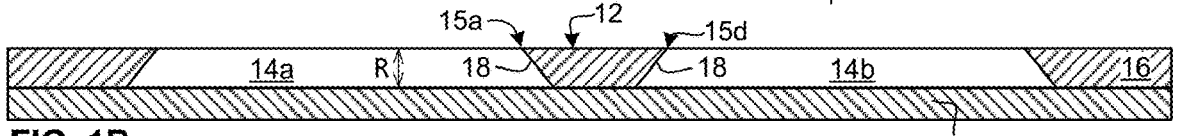
FIG. 1B is a side elevational view of the multi-modal target along section BB.

FIG. 1B is an image of the section BB of FIG. 1, showing cross-section through the target 10, including the top piece 16 and backing plate 17. FIGS. 1B,C,D are cross-sectional elevation views showing the undercut bevels 18 that meet the edges 15, and in particular FIG. 1D shows the angle of the undercut bevel, because the section line DD is perpendicular to the edge 15b. FIG. 1B also shows a depth of recess R of the distal surface 14a with respect to the proximal surface 12.

Figure 1C:
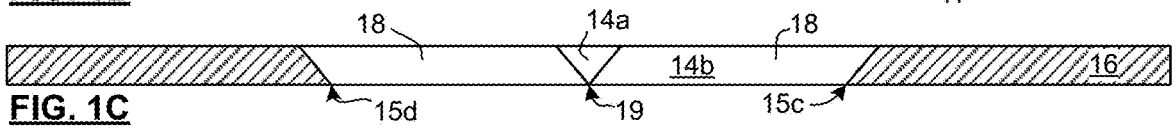
FIG. 1C is a side elevational view of the multi-modal target with the backing plate removed along section CC.
Figure 1D:
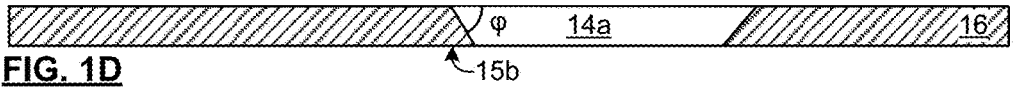
FIG. 1D is a side elevational view of the multi-modal target with the backing plate removed along section DD.

FIG. 1C is an elevation view of the section CC of FIG. 1A, showing cross-section through the top piece 16. The illustrated embodiment has the undercut bevel 18 extending a whole length of the edges 15. Accordingly in FIG. 1C, a wedge shaped opening 14a is visible between walls of the undercut bevel 18 in view. However, this may not be preferred. While notionally a target's centre should be the most crucial feature of the target 10, it is a substantial advantage of the present invention that it is expressly not so. Nexus 19 may not be as mechanically well supported as desirable in this configuration. The lines $I_1,I_2$ are better defined with the edges further from the centre, and thus at least a small diameter cylinder may be present at the centre, as it does not substantially limit the metrology tools used, or the use as a 2D target. Accurate machining of small interior angles on parts is challenging, as is the definition of fine features in molding. A diameter of the metrology tool (described hereinbelow) will dictate a limit of how close to the nexus 19 it is useful to define the edge 15, and a diameter of the cylinder. In such an embodiment, the nexus 19 is not identifiably located on the target 10, and the undercut bevel 18 ends a distance (such as 0.1-2 times R) from the nexus 19. In such an embodiment, no wedge-shaped opening 14a would be evident in this view but a cylindrical feature would block at least part of this opening.

It should be noted that the undercut of the edges 15 do not have to extend a full extent of the edges 15 to a frame surrounding the target face, and may be interrupted by one or more supports, mounting members or other features of either top piece 16 or back plate 17, for example if limited to 1-10% of the length of the edge 15.

FIG. 1D is an image of the diagonal section DD of FIG. 1A, showing cross-section through the top piece 16 running perpendicular to edge 15b. As such, an angle $\varphi$ of the undercut bevel 18 is defined. Herein it is presumed that the undercut angles of all reference edges are the same angle $\varphi$, so that the reference edges 15 remains a high contrast for a given range of angles in any direction of the measurement equipment with respect to the target plane. However, this is not necessary, and one or more of the edges 15 may have different undercut angles, generally requiring a given range of angles between the target plane and the measurement equipment. Such embodiments may involve a rotary mounting for the target to allow for rotation in dependence upon a plane of the target and the measurement equipment. Spherical joints are common for mounting targets so that the face of the target can be directed towards an imaging system.

The purpose of the undercut region is to provide a more accurate contact-based measurement: an edge gives a single point of contact for constraining movements in a more repeatable manner than a flat surface. Additionally, the undercut allows for a high contrast target between the edge and the region 14 over an increased range of angles between the measurement equipment and plane of target. Another way to avoid the error associated with imaging of the edge over a wide range of angles (in the case where the undercut bevel 18 is visible) is to paint the undercut bevel 18 as black or darker than the distal surface, providing low reflectance factor for light striking this surface.

No efforts need be made to endow the undercut region with a low reflectance factor (or one matching the distal plane), as long as the surface of the undercut 18 is not in view of the measurement equipment, as then uncertainty as to the location of the visual edge does not arise. For this reason, the smaller the angle $\varphi$, the better. However, the smaller the angle $\varphi$, the less mechanical support is provided for the edge 15, and the more easily the edge will be damaged by inadvertent contact with another object, or by the intended repeated contact with the metrology tool. Thus a trade-off is called for, that depends on particular applications, and particularly on the materials of which the target is composed. An angle $\varphi$ of 10-85° is workable for some applications and materials, and increasingly preferably are ranges of angles such as 15-80°, 20-75°, 25-70°, or 30-60°.

Figure 2:
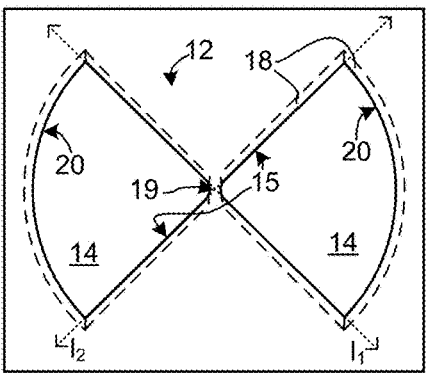
FIG. 2 is a schematic illustration of a multi-modal target with an additional peripheral edge follows a circle with a centre at a centre of the target.

FIG. 2 is a schematic illustration of a first variant of the target of FIG. 1. Herein variants of previously described embodiments will only be described insofar as they are different from the embodiment. Like references refer to like features, and are not generally described herein except to note differences. Edges 15 (only 2 identified for visual clarity), separate proximal surface 12 from two distal surfaces 14. Ghost view lines show the undercut 18. The edges 15 do not meet at the nexus 19, rather the edges 15 begin a short distance from an intersection of lines $I_1,I_2$. A second, independent, feature of FIG. 2 is that secondary edges 20 are provided that follow a perimeter of a circle centred on the nexus 19. It will be appreciated that forming, measuring, and confirming a centre of the circle are relatively complex processes that make reliance on edge 20. However, a large number of measurement points on the edge 20 may be useful, at least initially, for characterizing reference edges 15, and may have some use in metrology systems designed only for spherical targets. The secondary edge 20 may also be useful for automated identification of the target 10 from a 2D image.

Figure 3:
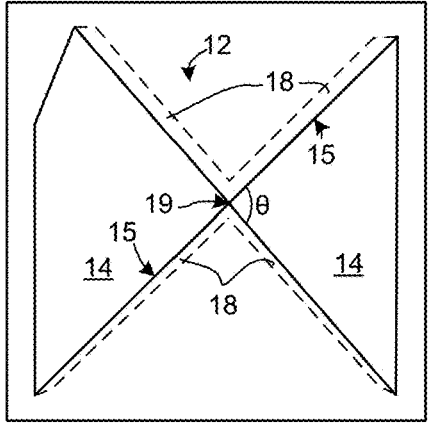
FIG. 3 is a schematic illustration of a multi-modal target with two reference edges that meet at an acute angle θ.

FIG. 3 schematically illustrates a second variant of the target of FIG. 1. Reference edges 15 (only 2 identified for visual clarity), separate proximal surface 12 from two distal surfaces 14. Ghost view lines show the undercut 18. The angle $\theta$ in this variant is less than 90°, such that the angle subtended by the edges 15 surrounding distal surfaces 14 at the nexus 19 are obtuse. The undercut 18 on one side of the target (visually top) is greater than on the other side, disposing this target to applications where the surface mounting of the target is expected to be oblique to the measurement equipment. This target would be oriented with the bottom edge closest the measurement equipment.

Figure 4:
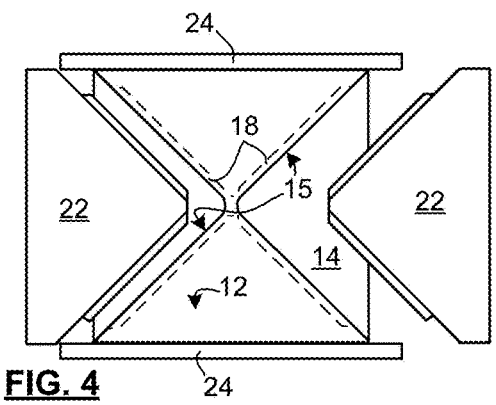
FIG. 4 is a schematic illustration of a multi-modal target with edge protective guards and no frame.

FIG. 4 schematically illustrates a third variant of the target of FIG. 1. No border is provided around the target face. An advantage of this embodiment is that a mold with minimal moving parts can produce the distal surfaces 14 integrated with the proximal surface 12 in a monolithic target 10. This allows high accuracy planar surfaces 12,14 and is not dependent on any joining or machining process. A second independent feature of this variant is a protective insert 22 provided to guard against damage to the edges 15. As noted above, the edges 15 of target 10 may be susceptible to damage and such an insert may be useful in protecting the target 10, for example, during transport. Preferably the insert 22 has two protective lips, one for insertion within the undercut area beneath the edge 15, and another for covering the edge 15. A slide for the insert 22 is provided in piece 24.

Figures 5A, 5B, 5C:
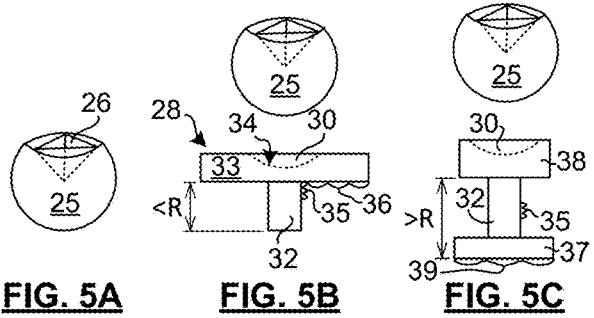
FIG. 5A is a schematic illustration of a first embodiment of a metrology tool that is a spherically mounted retroreflector (SMR)
FIG. 5B is a schematic illustration of a second embodiment of a metrology tool including a SMR nest overlying a shank.
FIG. 5C is a schematic illustration of a first variant of the second embodiment of a metrology tool with an SMR nest overlying a flat surface.

FIG. 5A is a schematic illustration of a SMR 25 with a set of mirrors 26 arranged to form 3 mutually orthogonal faces of a corner cube reflector, which is a first embodiment of a tool in accordance with the present invention. Other retroreflective structures, can equivalently be used. In a kit with a SMR 25 as a metrology tool, and a target 10, the distal surface 14 in a vicinity of the edge 15, and the edge 15, are the only contact areas for which particular attention needs to be paid during manufacturing to ensure repeatable registration. In particular the recess R may be equal to a radius of the SMR, whereby no compensation is required to determine a point of a plane of the proximal surface 12. Both an elevation of an edge 15 (i.e. the recess R) and its relation to the respective line must be ensured in this design, because the SMR's reference surface is its spherical body. Nonetheless, additional contact areas may be provided, for example, to permit acquisition of coordinates of a plane of the target 10, for example. It will be appreciated that instead of an SMR, a cylindrical body with a coaxial retroreflector could be the metrological tool in the present invention.

FIG. 5B is a schematic illustration of a second embodiment of a metrology tool useful in a kit with a multimodal target. The tool has a body 28 with a table 33 and a cylindrical shank 32. The table 33 provides a nest 30 with an accurate meeting surface 34 for receiving an SMR 25 (which may or may not be a part of the kit, as these are commonly interoperative elements of many 3D coordinate acquisition systems). The cylindrical shank 32 has a length less than the recess R of the target so that when an underside reference surface 36 is registered against the proximal surface 12 of the target, a bottom of the shank 32 cannot touch the distal surface 14. Edge contacting surface 35 is designed to repeatably contact the edge 15. The table 33, shank 32, meeting surface 34, body 28, as well as underside reference surface 36 and edge contacting surface 35 are rotationally symmetric at every angle of rotation. As such the tool has no preferred orientation, one particular part of the reference surfaces are not likely to wear out, leading to a tool with good longevity and accuracy. The nest 30 is centred on the shank 32, and accordingly the position of the measured retroreflector is offset by a fixed distance above a plane of the proximal surface 12 and by a radius of the shank from the edge 15. As is explained hereinbelow, the offset by the radius is irrelevant, as the two paired lines need only be parallel for center determination.

Note that shank tools are perhaps among the most common of nest mounting tools for metrology. The body 28 is different from common shank tools in that the shank meets the table at right angles. In most shank tools, a chamfer is provided to avoid imprecision of the measurement along edges that are not square. If a recess is required, it will be provided in the underside reference surface and not the shank. Applicant, in assessing the present invention, has adapted shank tools by press fitting a flat washer (made of nylon) of a thickness greater than the chamfer, around the shank so that the shank meets the bottom of the washer at a right angle. The bottom of the washer defines the underside reference surface.

FIG. 5C is a schematic illustration of a first variant of the second embodiment of a metrology tool useful in a kit with a multimodal target. This variant makes contact with the distal surface 14 of the target as opposed to the proximal surface 12. The tool includes the shank 32 concentrically aligned with a top end 38 supporting the nest 30, and a bottom contact pad 37 supporting a bottom reference surface 39 adapted to meet a contact area on the distal surface 14 of the target. The top end 38 is separated from the bottom reference surface 39 by more than recess R so that the top end 38 does not contact the proximal surface 12 when the bottom reference surface 39 is in registration. A radial extent of the contact pad 37 is also preferably chosen to guard against contact with the riser or bevel of the target when the bottom reference surface is registered, to avoid interference between the edge contacting surface 35 and the edge 15. This tool is also symmetric. Like the SMR 25, this tool requires a well-defined distal surface 14. The nest is centred on the shank, and a similar radial offset is required for measurement, but the planar offset is determined by a spacing between the nest 30 and bottom reference surface 39, less R.

Figure 5D:
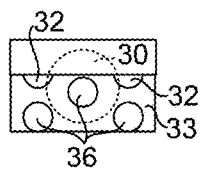
FIGS. 5D,E are respectively bottom plan and side elevation schematic views of a second variant of the second embodiment of a metrology tool with a SMR nest overlying an edge.

FIGS. 5D,E are schematic illustrations of a second variant of the second embodiment of a metrology tool useful in a kit with a multimodal target. This variant is non-symmetric. Having regard to FIG. 5E, the tool comprises a table 33 with a top surface providing the nest 30, and an underside reference surface 36, which is provided by three spaced hemispheres. The spacing of the hemispheres is better seen in FIG. 5D. The shank 32 and edge contacting surface 35 of FIG. 5B are replaced with two cylindrical bosses 32 which provide edge contacting surfaces. While the second embodiment is radially symmetric, the two spatially separated bosses lock the tool in a particular angular orientation when registered.

Figure 5E:
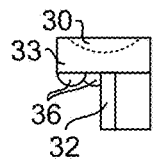
FIG. 5F is a schematic illustration of a third embodiment of a metrology tool with an SMR nest surrounded by three fixed metrology tools of the third embodiment.
FIG. 5G is a schematic illustration of a fourth embodiment of a metrology tool with an SMR nest surrounded by four metrology tools of the second embodiment, that are prismatically mounted for centred mounting to a multimodal target.

A centre of the spherical nest may conveniently be aligned with a limit of the bosses 32 (as best seen in FIG. 5E) so that no radial offset is called for, and the only offset required is in a direction of the plane of the proximal surface 12.

By analogy to the differences between the second embodiment and the first variant thereof, a non-symmetric metrology tool, for meeting the distal surface 14 can be constructed. As such a tool is non-symmetric, it may have a larger bottom reference surface away from the edge to improve stability.

The reference surfaces of the second variant of the second embodiment may be preferred for low friction, slightly higher accuracy, registration. In general, machined planar surfaces are found to be sufficient, but in all cases meeting surfaces of the present invention can be provided by hemispheres or like features known in the art of kinematic and semi-kinematic mounts.

The second variant is similar to known edge tools with SMR nests, but different in that commercial edge tools are not functional for this purpose. Commercial edge tools have a recessed top corner because of a need to remove the complete interior corner, when the tool is machined. The recess catches an unpredicatable and poorly controlled amount of the edge, leading to an inaccurate measurement.

Similarly to how the shank tool may be modified to function in the present invention, a pad of uniform thickness may be used to cover the recessed part of a commercial edge tool.

Figure 5G:
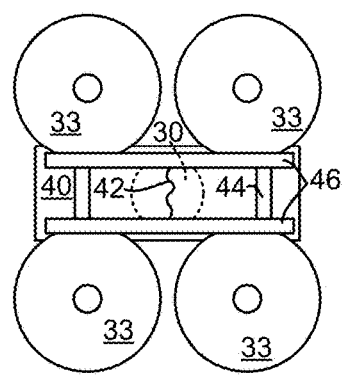
Figure 5F:
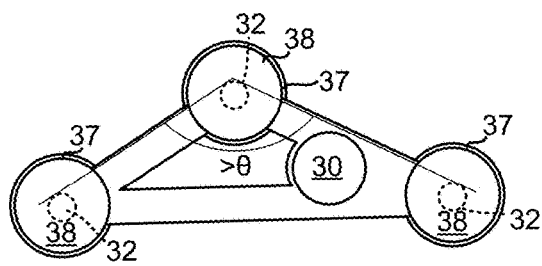

FIG. 5F is a schematic illustration of a third embodiment of a metrology tool for use with a multimodal target. The third embodiment comprises a body for fixed arrangement of three instances of the first variant of the second embodiment, but with the nest (optionally) removed. The body has a single nest 30 for an SMR 25 on a top surface. The three instances have respective shanks 32 shown in ghost view, and respective bottom contact pads 37. To ensure that the tool can be used to contact two edges 15 bounding a distal surface 14 in two distinct orientations, a triangle defined by centres of the shanks 32 (assuming all the same size) has an angle greater than 0, and the lengths of the sides of the triangle adjacent this angle must be less than a smallest length of the edges 15. If the triangle is isosceles, and the nest 30 lies on the line of symmetry of the triangle, the measurements will be at a same radius from the target centre, however it is substantially lower cost, and more efficient to use simple and reliable geometric calculations to solve the target centre without requiring onerous alignment in manufacturing the tool. Furthermore, with an obviously scalene triangular form, and placement of the nest 30 away from a center of the triangle, errors caused by associating different measurement configurations are obvious and easy to detect automatically. A difference in colour or feature on the tool is helpful in limiting the chances of user error.

While the illustrated third embodiment uses the distal surface 14 as the reference, the proximal surface 12 could be used instead, if the three contact structures were altered to resemble the second embodiment. While the three contact structures illustrated are shown as examples of the first variant of the second embodiment, and may even be detachable from the tool, the integration of contact structures in a single body need not have such a structure.

It is noted that the number and distribution of contact pads in the illustrated embodiment is excessive, unless the contact pads are, for example, single point of contact meets (such as hemispheres) instead of the spatially extended, flat, pads as shown. The number and shape of bottom contact pads 37 results in an over-provisioned meeting of the tool with the distal surface 14, which is fine if there is no warping or deformation of the tools or proximal surface 12, no dirt or debris, and they can be suitably engineered. The contact pads 37 may alternatively be provided as a single contact pad 37, for example, underneath or proximate the nest 30.

It should be noted that each of the contact structures may be prismatically jointed to the body. As long as the prismatic joints have limited play and are oriented in parallel axes, a remaining structure of the tool has no affect on the reproducability of the measurement. This allows for low cost design and fabrication. The prismatic joints may be actuated to ensure that each bottom pad contact pad makes a good contact with the distal surface 14 and a divergence of the displacements of the three prismatic joints may be noted before use of the tool to ensure placement accuracy. On-tool sensors may be used to assess this prior to measurement acquisition, and may further include contact transducers that report a force or pressure applied on the edge 15. The tool and a metrology system may be equipped with electronics for wireless communications.

FIG. 5G is a schematic bottom plan view of a fourth embodiment of a metrology tool for use with a multimodal target. The fourth embodiment has four contact structures designed for meeting respective ones of the four meeting surfaces 14, coupled to a body 40. A top surface (not in view) of the body 40 has a nest 30 (shown in ghost view). The contact structures are shown to be defined in accordance with the second embodiment. The contact structures are shown coupled in pairs to sliders 46 that are guided by a pair of guides 44 to produce a prismatic joint that permits reciprocating movement of the sliders 46, and the contact structures coupled thereto. A spring 42 (schematically illustrated), or its equivalent (an elastomeric material with both damping and elasticity is preferred), biases the sliders 46 in a given separation, which may be closer or further than a separation necessary for contact of all four shanks to the four edges 15, depending on the design. In the illustrated image the sliders 46 are shown retracted as it affords a better view of the construction of the tool. Accordingly, the user will retract or expand the sliders 46, place the four shanks into the two recesses of the target, and release the sliders 46 to permit the force applied by the spring 42 to align the tool with the edges 15. By an equalization of pressure, the tool body will rotate, and slide into position in the planar degrees of freedom. By maintaining pressure on the underside reference surfaces, the tool comes to a registered position. It will be appreciated that the same tool can be rotated 180° to provide two measurements, a midpoint between which defining the target centre, and a rotation of 90° can permit two more measurements to be taken to assess uncertainty of the measure, although these latter measures may require an inverted pressure for alignment, which may require the user to actively apply the pressure against the spring 42 during these measurements. An ergonomic handle may be provided for facilitating the operation of the spring and the pressing of the underside reference surfaces.

Figure 6A:
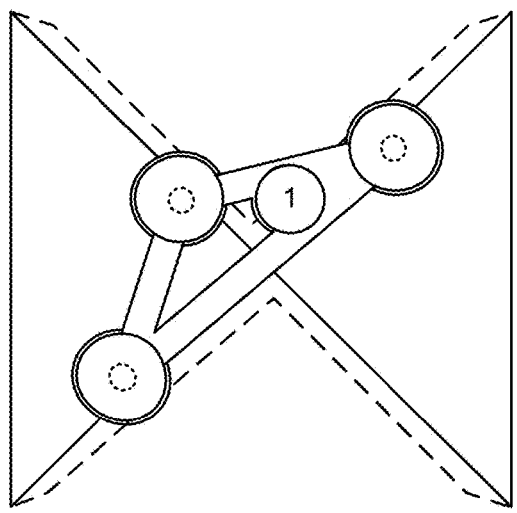
FIG. 6A is a strip showing 4 steps in a process for acquiring coordinate of a target centre using the tool according to the fifth embodiment.
Figure 6A:
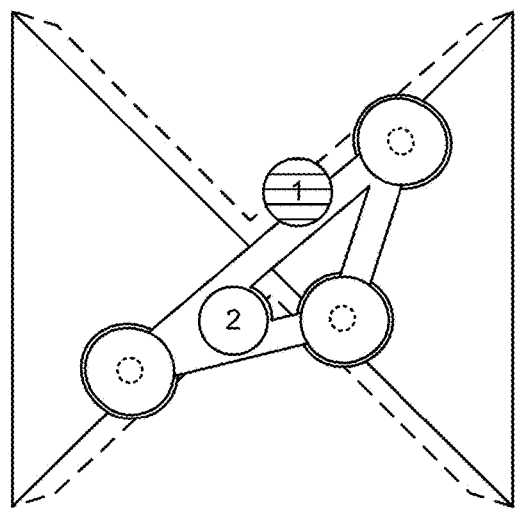
Figure 6A:
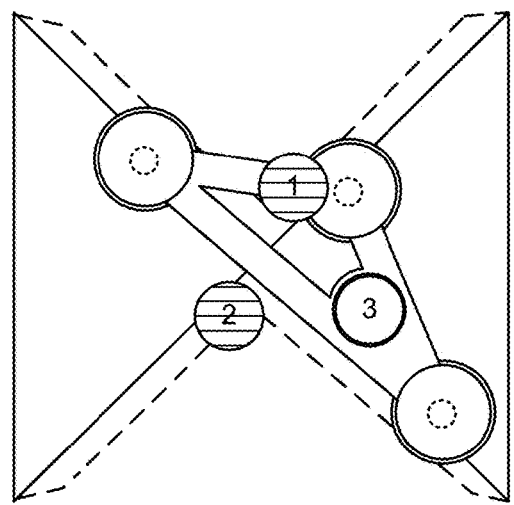
Figure 6A:
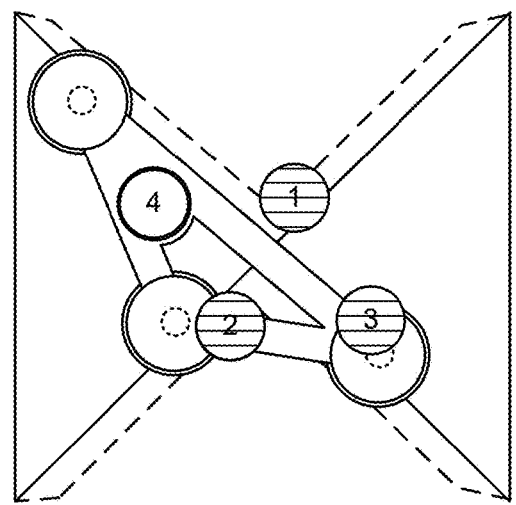

FIG. 6A is a strip showing four steps in acquiring a centre of a target using the third embodiment of the metrology tool. Each step shows a corresponding orientation of the tool with respect to the target. The shank is shown in ghost view to represent what a user can feel, in terms of the contact with the edges of the tool. In general, each position involves contacting two radially opposite edges with the contact structures that are most widely spaced apart. With these two contact structures meeting the edge, the tool is slid manually along these edges until the third contact structure meets a transverse edge. Measurements taken at successive steps are shown in subsequent steps to show the acquisition of 4 points. By rotating the tool 180° a second measurement point is taken. By switching which pair of contact structures are in a same recess of the target, two more measurements can be acquired in steps 3 and 4. The midpoint or intersection of line segments joining the opposite measurements determines the centre of the target.

Figure 6B:
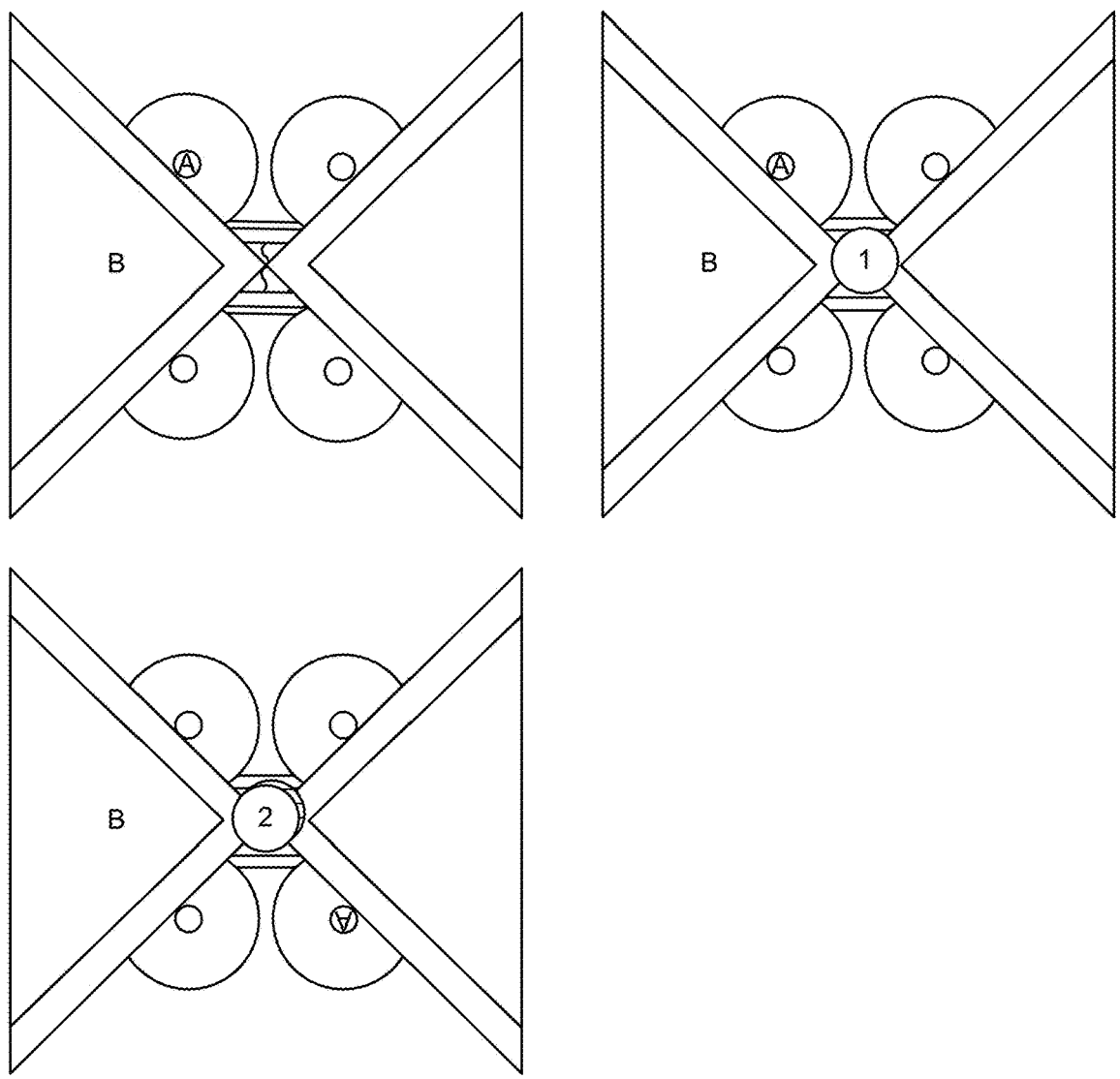
FIG. 6B is a strip showing three steps in a process for acquiring coordinate of a target centre using the tool according to the sixth embodiment.

FIG. 6B is a strip showing three steps in acquiring a target centre using the fourth embodiment of the metrology tool. The view is from below, with a backing plate of the target removed. The first step shows the tool with the shanks separated for insertion into the two recesses. The tool is not aligned initially in the plane. The second step shows the tool aligned once the pressures are equilibrated and the contact is uniformly made at the four points. A centre of the tool need not lie directly above the tool, as this requires precision alignment that may be difficult to obtain and ensure throughout a life of the tool. Instead a second measurement is made rotating the tool 180°. This rotation is shown by annotating the bottom of the target and one of the shanks. While the second measurement is shown overlying the first measurement, in fact the measurements are geometric points and a midpoint between these points is taken to be the centre of the target. Alternatively measurements at 90° rotations could be taken to estimate uncertainty of the measurement.

Figure 6C:
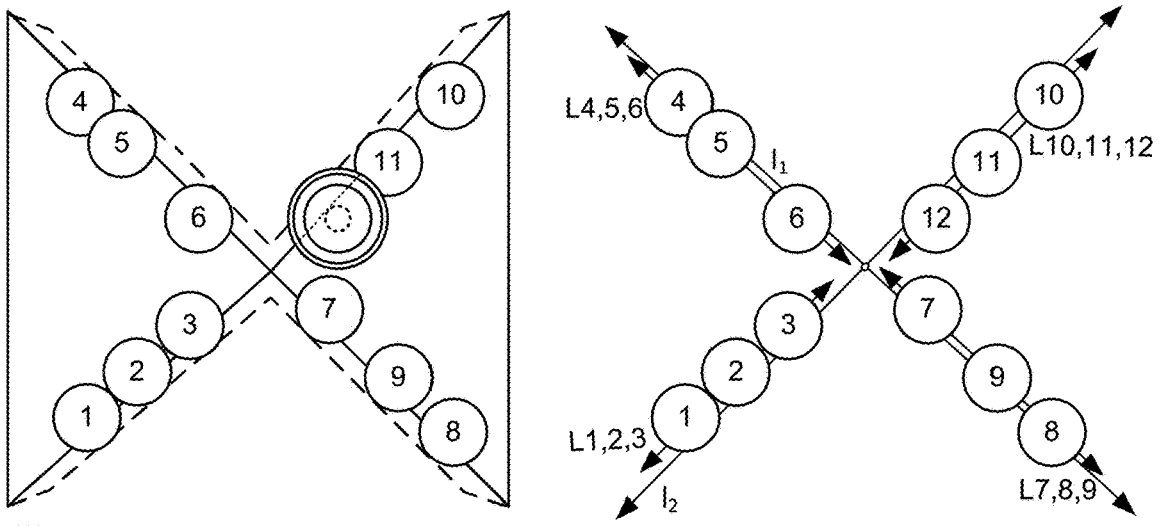
FIG. 6C is a strip showing two steps in a process for acquiring coordinate of a target centre using the tool according to the third embodiment.

FIG. 6C is a strip showing two steps in acquiring a target centre using the first varian of the second embodiment of the metrology tool (although the same process is performed with the first embodiment, second embodiment and variants thereof). The process involves acquiring at least three points along each edge. Two are all that is required for defining respective lines, however the third measure provides an uncertainty estimate, and guides the user in determining whether any further measurements are required for a given uncertainty. How straight the edges are and how parallel are their pairs, are essential in this embodiment. The first step shows all points having been taken and the tool in position to measure the last point. It is noted that the positions of the points along the lines are not regular. An order of the measurements is equally unimportant. Each trio of points is used to construct a line with a given uncertainty (L1,2,3; L4,5,6; L7,8,9; and L10,11,12). If the uncertainty is below a threshold indicating a faulty measure, the line is accepted; if not the points may be discarded and all are remeasured, or one or two more points are taken until an acceptable line is found. The paired lines are averaged to identify the lines $I_1, I_2$. An intersection of lines $I_1, I_2$ is the centre of the target.

EXAMPLES

Figure 7:
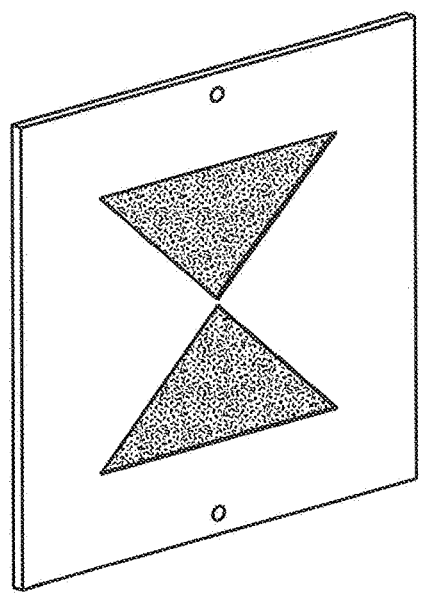
FIG. 7 is a photograph of a target built to demonstrate the present invention.

FIG. 7 is a photograph of an example of a multimodal target in accordance with the present invention. This example is made in the two piece design. The top piece is a square plate (10" sides) of solid aluminum, 0.5" thick. The square plate was machined by CNC machining. A $\varphi=45°$ bevel was made from the back-side of the plate to form an undercut bevel from the front face of the target. A centre of the target, which crosses the both the lines $I_1, I_2$ at 45°, with $I_1, I_2$ meeting at 90°. A maximum width of the distal surfaces was about 6 inches and a 2" frame is provided around the target face. Two boreholes are used for mounting and are located above and below the target face, substantially on centre. A black backing plate was adhered to the back of the machined top piece to form a high contrast target.

The photograph shows an image taken at an angle that is tilted in two directions. Despite the unusually large angle of imaging for most medium range (2-150 m) coordinate measurement apparatus, the target shows none of the undercut surface 18, and accordingly provides excellent contrast for image-based techniques such as photogrammetry, as well as LiDAR, laser scanner, and laser triangulation systems.

The target was characterized by measurements using an articulated arm coordinate measurement machine (AA-CMM) and the surface 12 was found to have a flatness within 200 µm on 12 samples. The four reference edges 15 were characterized using the AA-CMM and were found to have a straightness to within 75 µm, and that the paired edges were parallel to within 0.1°.

Figure 8:
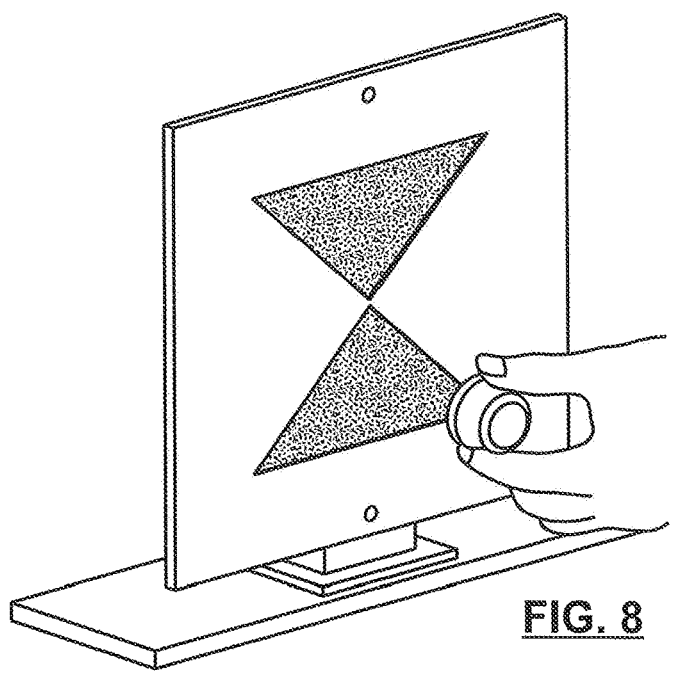
FIG. 8 is a photograph showing the target being measured according to a process shown in FIG. 6C using a modified shank tool, according to FIG. 5B.

FIG. 8 is a photograph showing a commercially available 1.5" SMR (Leica Geosystems of Atlanta Ga.) being used with the target of FIG. 7 for contact-based laser tracker measurement. There are a wide range of SMRs that are commercially available. While each SMR has a respective radius (usually 1.5", 0.875", or 0.5"), beam shift error, and reflectivity in response to illumination for which it was designed, the half inch depth of the area 14 with respect to the surface 12 accommodates any SMR.

The method for acquiring the target centre of FIG. 6C, using a tool of the second embodiment, has been performed on this target many times. It has found to be repeatable up to 150 µm (RMS) at a 5 m distance with a 3D laser tracker (Faro of Lake Mary Fla.). Using the same 3D laser tracker and distance, and a tool according to FIG. 9 (described herein below), the repeatability was found to be below 20 µm (RMS).

Figure 9A:
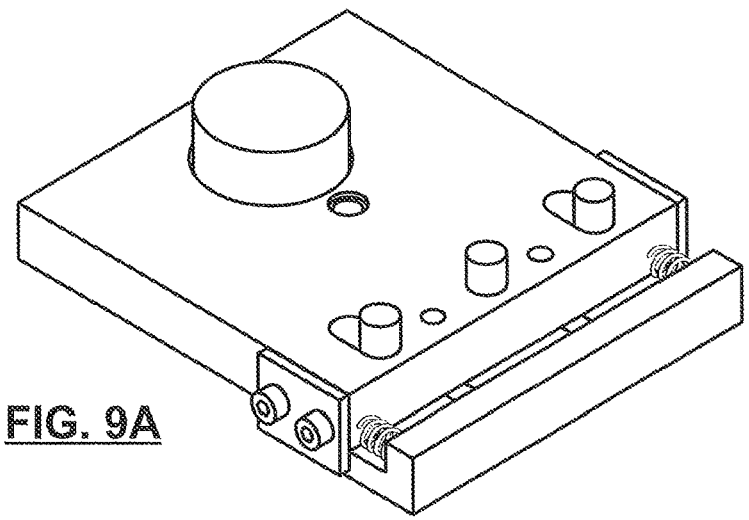
FIGS. 9A,B are photographs of a bottom and top sides of a tool similar to the sixth embodiment that was used to demonstrate the present invention.
Figure 9B:
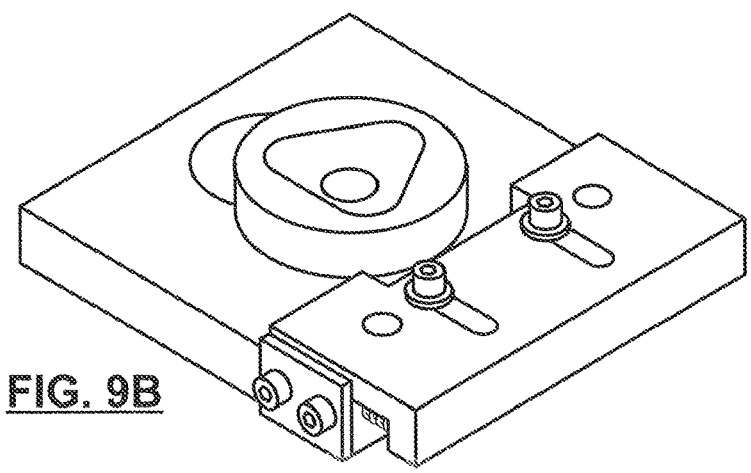

FIGS. 9A,B are photographs of bottom and top sides of a metrology tool used to demonstrate the present invention. Like the embodiment of FIG. 5G, for use in the method of FIG. 6B, four points of contact are provided for contacting each of four edges of the target. Two of these points of contact are on a large diameter cylindrical protrusion visibly extending from the bottom of the tool (centre-left, in FIG. 9A). This substitution of a single body having rounded contours to define two contact points can equally replace the other two contact points of the embodiment of FIG. 5G, or consolidate the shanks of the embodiment of FIG. 5F. The other two points are provided by spring-mounted and prismatically jointed (visible in FIG. 9A) contact cylinders extended through slits on the right near the sides. A fourth cylinder in this view is of no concern for the present invention, but an artefact of repurposing of the tool. Each of these four cylinders extends from a flat reference surface for meeting a proximal surface of the target. A shank tool is mounted through a small hole in the references surface adjacent the large diameter cylindrical protrusion. A bottom face of the shank tool is visibly recessed from the reference surface shown in FIG. 9A. FIG. 9A also shows the springs and a sliding body coupled to the springs, along with sliding rods within guides for mechanically joining the two contact cylinders in unified prismatic movement. FIG. 9B shows a top of the tool with the nest associated with the shank, mounted thereto (centre), which partially overlies the reverse side of the large diameter cylindrical protrusion. Two more sliders and grooves are visible at the top surface, as well as the manner in which the two contact cylinders are coupled to the sliding body.

This tool has been found very effective at quickly determining a centre of the target. Once a plane of the proximal surface is acquired, two measurements are all that is required to determine a centre of the target, which has proven to be very efficient. The process for acquisition of the target centre involves placing the four points of contact in the two recessed areas, applying a pressure to maintain the tool against the proximal surface, and pressing the sliding body to depress the springs until the four points are met. Measurement of an SMR in the nest at point is compared with a measurement with the tool 180° rotated, and a midpoint between the two measurements, projected onto the plane is the centre.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:
1. A kit for determining a position of a target for industrial dimensional metrology, the kit comprising:
    a target with a mounting part for mounting in an object space, and a target face, the target face including at least one proximal surface and at least one distal surface, where:
        each of the distal or each of the proximal surfaces is primarily flat and faces a common normal direction;
        each distal surface differs by at least 3 mm from each proximal surface along the normal direction;

reflectivity factors of each of the distal surfaces differ by at least 20% from that of each of the proximal surfaces;

risers connecting pairs of the proximal and distal surfaces are sufficiently undercut so that none of the risers are in view at any angle within 5° from the normal direction; and at least two reference edges are defined where the risers meet the respective proximal surfaces; and a metrology tool comprising either a retroreflector or a nest for a retroreflector, the tool having one or more meeting features for registration with one or more of the edges and the primarily flat surfaces, wherein the edges are arranged so that acquisition of coordinates of the retroreflector, or a retroreflector mounted in the nest, with the tool in at least two registered positions, determine at least a centre of the target.

2. The kit of claim 1 wherein the edges are primarily linear.

3. The kit of claim 1 wherein the reference edges extend radially from the centre, or offset from radial by a fixed distance.

4. The kit of claim 1 wherein the risers are sufficiently undercut so that no part of the risers are in view at any angle 15° from the normal direction.

5. The kit of claim 1 wherein the reference edges extend a length of the risers, and the risers are undercut bevels that have an angle from 15-75°.

6. The kit of claim 5 wherein the bevel has an angle from 30-60°.

7. The kit of claim 1 wherein at least one of the meeting features are infinitely rotationally symmetric about a line passing through a centre of the retroreflector, whereby an angle of the tool with respect to the line has no influence on a measurement of the retroreflector's position.

8. The kit of claim 1 wherein the meeting features comprise:

one or more first features for contacting contact areas of the target, to register the tool to one of the primarily flat surfaces; and one or more second features for contacting one or more of the edges where each contact area is near one of the edges, and is located on one of the distal surfaces, or one of the proximal surfaces, but not both.

9. The kit of claim 8 wherein the contact areas:

have a surface area to match the one or more first features that fix the tool in one or more angular degree of freedom as well as fixing the tool location in the normal direction when registered; or are only on the proximal surfaces, in bands parallel to the edges.

10. The kit of claim 8 wherein the tool comprises a plurality of sets of the second features, arranged so each set is adapted to contact respective ones of the edges concurrently in a registered pose.

11. The kit of claim 10 wherein:

the edges are linear, and define the target centre as a midpoint between measured points of the retroreflector projected onto a plane of the proximal surface, and the tool comprises three second features arranged in a triangle; or the edges define four lines, extending generally radially from the target centre, and the tool comprises four sets of second features, each for contacting respective ones of the edges at a single points, and mechanism for pressing the second features against the edges while they are free to slide along the edge until the tool is registered.

12. The kit of claim 11 wherein the three second features are spaced to permit:

two second features to meet one edge and the third to meet a second edge of the same distal surface, in at least two visibly different configurations, and the triangle is not equilateral; or two second features to meet two edges of one distal surface, and the third to meet an edge of another distal surface, in at least two visibly different configurations, and the triangle is not equilateral.

13. The kit of claim 11 wherein the mechanism comprises a spring.

14. The method of claim 11 wherein the mechanism comprises a spring.

15. A method for determining a position of a point in an object space for industrial dimensional metrology, the method comprising:

mounting a target in an object space to present a target face of the target, the target face including at least one proximal surface and at least one distal surface, where:

each of the distal surfaces or each of the proximal surfaces is primarily flat and faces a common normal direction;

each distal surface differs by at least 3 mm from each proximal surface along the normal direction;

reflectivity factors of each of the distal surfaces differ by at least 20% from that of each of the proximal surfaces;

risers connecting pairs of the proximal and distal surfaces are sufficiently undercut so that none of the risers are in view at any angle 5° from the normal direction; and at least two reference edges are defined where the risers meet the respective proximal surfaces;

contacting a metrology tool comprising a retroreflector or a nest therefor, with the target face, with one or more meeting features of the tool contacting one or more of the edges;

acquiring coordinates of the retroreflector; and using the acquired coordinates to determine at least a centre of the target.

16. The method of claim 15 wherein at least one of the meeting features are rotationally symmetric about a line passing through a centre of the retroreflector, whereby an angle of the tool with respect to the line has no influence on a position of the edge relative to the position of the retroreflector's position.

17. The method of claim 15 wherein contacting the tool comprises:

contacting one or more first features of the tool with contact areas of the target, to register the tool to one of the primarily flat surfaces in the normal direction; and contacting one or more second features of the tool with the one of the edges at one or more locations, where the contact areas are on either the distal surface, or the proximal surface but not both.

18. The method of claim 17 wherein the contact areas:

have a surface area to match the one or more first features that fix of the tool in one or more angular degree of freedom as well as fixing the tool location in the normal direction when registered; or are only on the proximal surfaces, in bands parallel to the edges.

19. The method of claim 17 wherein the tool comprises a plurality of sets of the second features, arranged so each set is adapted to contact respective ones of the edges concurrently in a registered pose.

20. The method of claim 15 wherein the edges:
are linear, and define the target centre as an intersection of mean geometric lines defined by the edges projected onto a plane of the proximal surface, and the tool comprises two sets of second features, a first set for contacting a first of the edges at a single point, and a second set for contacting a second of the edges at two separate points;
are linear, and define the target centre as an intersection of mean geometric lines defined by the edges projected onto a plane of the proximal surface, and the tool comprises three sets of second features, each set for contacting a respective different one of the edges at a single point; or
define four lines, extending generally radially from the target centre, and the tool comprises four sets of second features, each for contacting respective ones of the edges at a single points, and mechanism for pressing the second features against the edges while they are free to slide along the edge until the tool is registered.

21. A system for determining a position of a point in an object space for industrial dimensional metrology, the system comprising:

a target mounted in an object space to present a target face of the target to at least one acquisition system, the target face including at least one proximal surface and at least one distal surface, where:
each of the distal and proximal surfaces is primarily flat and faces a common normal direction;
each distal surface differs by at least 3 mm from each proximal surface along the normal direction;
reflectivity factors of each of the distal surfaces differ by at least 20% from that of each of the proximal surfaces;
risers connecting pairs of the proximal and distal surfaces are sufficiently undercut so that none of the risers are in view at any angle 5° from the normal direction; and
at least two reference edges are defined where the risers meet the respective proximal surfaces; and
a metrology tool bearing a retroreflector with the target face, with one or more meeting features of the tool contacting one or more of the edges; and
the acquisition system for acquiring coordinates of the retroreflector, and using the acquired coordinates to determine at least a centre of the target.

* * * * *